UNITED STATES PATENT OFFICE.

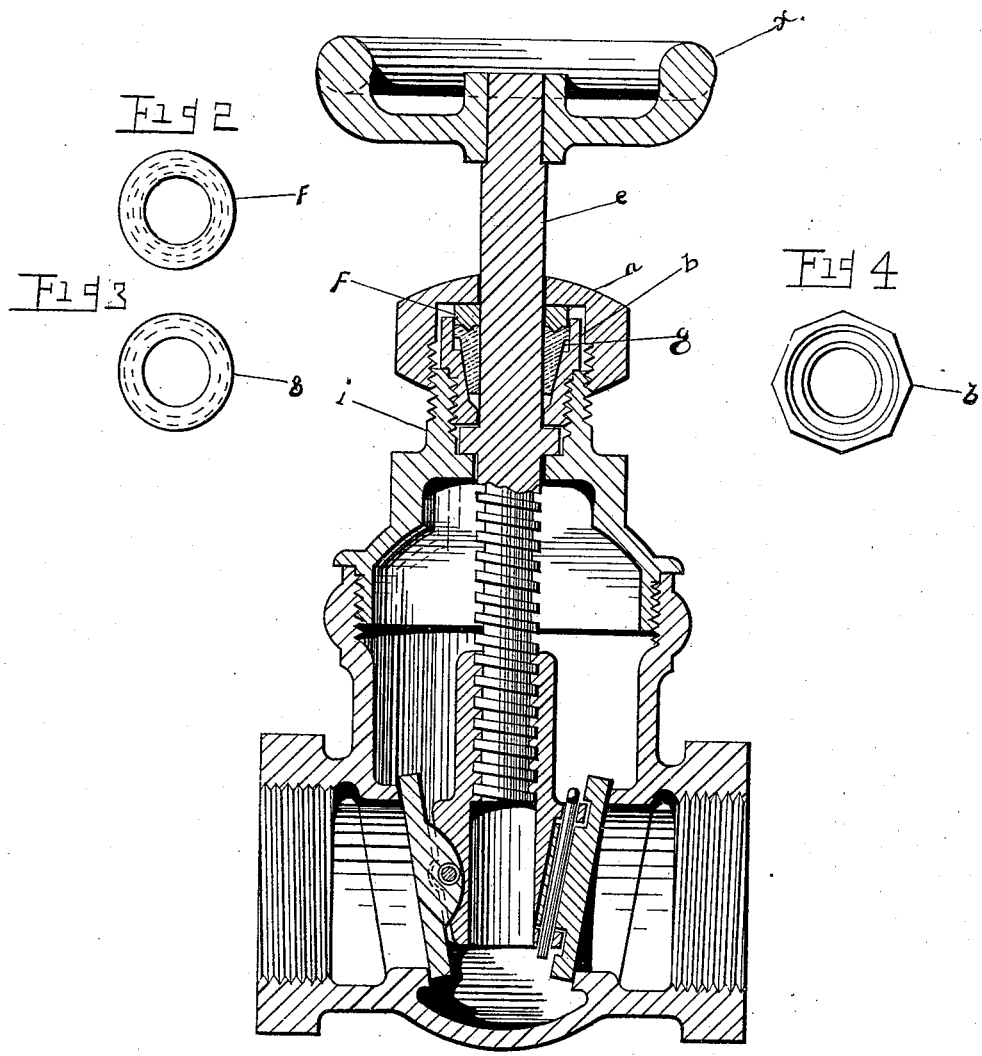

WILLIAM G. NELSON AND CHARLES F. BATT, OF BROOKLYN, NEW YORK.

VALVE-STEM PACKING.

SPECIFICATION forming part of Letters Patent No. 552,137, dated December 31, 1895.

Application filed April 22, 1895. Serial No. 546,793. (No model.)

*To all whom it may concern:*

Be it known that we, WILLIAM G. NELSON and CHARLES F. BATT, citizens of the United States, and residents of the city of Brooklyn, county of Kings, State of New York, have invented certain new and useful Improvements in Valve-Stem Packings, of which the following is a specification.

Figure 1 is a longitudinal sectional view of a valve embodying our invention; Fig. 2, a plan of the compression-washer; Fig. 3, a plan of the packing; Fig. 4, a plan of the thrust-nut.

Our invention relates to improvements in valve-stem packings; and it consists of the constructions and combination of devices which we hereinafter fully describe and claim.

The essential objects of our invention are to provide a durable antifriction soft-metal packing that will not be affected by the continuous action of steam, water and acids, and that can readily be adjusted by compression with the minimum of wear on the working parts.

In the drawings, which show our improvement as applied to an improved valve for which Letters Patent No. 499,030 were granted June 6, 1893, to William G. Nelson, $a$ represents a compression-nut, and $b$ the thrust-nut for taking thrust of spindle or stem $e$ and receiving the packing-bushing $g$. This thrust-nut $b$ is recessed to receive the packing $g$, which is preferably made in taper or cone shape, as shown in the drawings.

$f$ is a ring or follower placed upon the packing and is provided with an annular V-shaped projection on its under face to more readily expand the packing $g$. We preferably make the packing of lead or soft composition metal and in one piece, it being put into position over the end of the stem by removing the hand-wheel $x$, although we do not wish to limit ourselves to this construction, as the packing may consist of several rings made in sections and breaking joints in the recess made to receive them. This recess can be made in any desired form best calculated to confine the metal packing when under compression and crowd or force it around the stem.

The packing when placed in position with the compression-washer $f$ on top of it is expanded and forced to a close contact with the stem by screwing the packing-nut $a$ down on the threaded neck or top of the bonnet $i$.

The compression-washer $f$ instead of being a separate piece may be formed on the inside and a part of the compression-nut $a$.

Having thus described our invention, what we claim as new, and desire to secure by Letters Patent, is—

1. In rod packing, the combination, with a rod, and a packing chamber surrounding it, the lower part of the said chamber being conical, of soft metallic packing surrounding the said rod in the said chamber, a ring provided with an annular V-shaped projection on its face, and means for forcing the said projection into the upper face of the packing, thereby spreading it at the top and pressing its lower portion into the conical portion of the chamber around the rod, substantially as set forth.

2. In rod packing, the combination, with a screwthreaded neck, and a thrust nut secured therein and provided with a packing chamber having a conical lower portion, of a rod in the chamber, a ring provided with an annular V-shaped projection on its face bearing on the upper end of the packing, and a compression nut engaging with the said neck and operating to force the said ring into the packing and to press the packing in the conical portion of the chamber, substantially as set forth.

In testimony that we claim the foregoing as our invention we have signed our names, in presence of two witnesses, this 15th day of April, 1895.

WILLIAM G. NELSON.
CHARLES F. BATT.

Witnesses:
C. L. MALCOLM,
C. S. WINGATE.